United States Patent [19]

Rebhan

[11] Patent Number: 4,514,425
[45] Date of Patent: Apr. 30, 1985

[54] MOLD GROWTH INHIBITOR AND METHOD

[75] Inventor: Herbert J. Rebhan, New Richmond, Wis.

[73] Assignee: Domain, Inc., New Richmond, Wis.

[21] Appl. No.: 363,123

[22] Filed: Mar. 29, 1982

[51] Int. Cl.³ .............................................. A23B 9/00
[52] U.S. Cl. ..................... 426/93; 426/289; 426/335; 426/532
[58] Field of Search ................ 426/93, 96, 289, 321, 426/331, 335, 532, 618; 424/280, 317

[56] References Cited

U.S. PATENT DOCUMENTS

| | | | |
|---|---|---|---|
| 2,865,764 | 12/1958 | Gorsica et al. | 426/335 |
| 3,937,814 | 2/1976 | Nickerson et al. | 426/335 |
| 4,016,294 | 4/1977 | Glabe et al. | 426/532 |
| 4,034,117 | 7/1977 | Glabe | 426/532 |
| 4,083,999 | 4/1978 | Drury et al. | 426/532 |
| 4,172,897 | 10/1979 | Ueno et al. | 426/532 |
| 4,299,854 | 11/1981 | Glabe et al. | 426/331 |
| 4,350,709 | 9/1982 | Vidal et al. | 426/335 |

OTHER PUBLICATIONS

Cirilli G., Mycostatic & Antimycotic Activity of Aflaban, International Free Univ., Italy 1980.
Cirilli et al., Corn Silages & Spores, L. Univ. ta Int. le Galilei Lab., Italy.

Primary Examiner—Raymond Jones
Assistant Examiner—Marianne S. Minnick
Attorney, Agent, or Firm—James R. Haller

[57] ABSTRACT

A dry, powdery composition containing mold inhibiting quantities of sorbic acid or a salt thereof and sodium diacetate may be coated on grain or grain products to inhibit mold.

8 Claims, No Drawings

MOLD GROWTH INHIBITOR AND METHOD

FIELD OF THE INVENTION

This invention relates broadly to the field of agriculture, and particularly to the field involving long-term storage of whole-kernal grains such as corn.

BACKGROUND OF THE INVENTION

Whole grain cereals such as corn, oats and the like, when harvested, commonly contain significant amounts of moisture, e.g., in the range of from 20%–35%. When stored under aerobic conditions, whole kernel grains quickly develop mold which in turn not only renders the grain less palatable to animals but additionally may form toxic substances known as mycotoxins.

One method of reducing or inhibiting mold growth involves the drying of whole kernel grains immediately after harvesting to reduce the moisture content of the grains. Another method involves the treatment of whole kernel grains with solutions containing mold-inhibiting chemicals such as sodium diacetate, or certain organic acids such as propionate acid, and blends of acetic acid and sorbic acid. Solutions of mold-inhibiting chemicals, such as aqueous solutions of formalin, propionic acid, formic acid, benzoic acid, acetic acid, sorbic acid, isobutyric acid, etc., have been used to treat silage. One researcher has reported the treatment of silage with an aqueous solution containing sodium diacetate and sorbic acid or a salt thereof, optimum results being reported at a concentration of 0.04% sorbic acid and 0.02% sodium diacetate. Reference is made to G. Cirilli et al, *Corn Silages and Spores, 1st Note-Antifungal Treatments*, Tecnica Molitoria, 19–20; Cirilli, *Mycostatic and Antimycotic Activity of Aflaban—Experimental Study, 1976–1980*, Report of International Free University, Laboratory of Applied analytical Chemistry, Bologna, Italy; Glabe, U.S. Pat. No. 4,034,117; and Glabe et al, U.S. Pat. No. 4,015,018.

Prior to the present invention, the generally preferred method for inhibiting mold growth on whole kernel grains such as corn was the drying process which reduces the moisture content to about 15% but which also is very expensive and, further, decreases feed value. The treatment of whole kernel grains with solutions of propionic acid, blends of acetic and sorbic acid, and sodium diacetate, all for the purpose of inhibiting mold growth, have shown some promise but do not appear to be commercially feasible.

SUMMARY OF THE INVENTION

It has now been found that mold growth in whole kernel grain can be inhibited by coating the grain kernels with an effective amount of a dry, particulate, finely divided, powdery composition containing mold-inhibiting quantities of sodium diacetate and sorbic acid or a salt thereof. This treatment of freshly harvested grain (containing from about 20% to about 35% moisture, typically about 22%) can be accomplished quickly and easily without the use of complex spraying devices and without adding additional moisture to the grain. The treatment has proven very effective in inhibiting mold growth, and appears to involve a substantially complete coating of each grain kernel with the powdery composition. Although any appropriate means of applying the composition to grain kernels can be employed, the preferred method involves the introduction of grain and the composition to a rotating "tumble" drum in which the kernels rub together and in which each kernel is substantially completely coated with the composition.

In a preferred embodiment, the particulate composition includes sorbic acid or a salt thereof and sodium diacetate in a weight ratio of about 0.04/1 to about 1/1, respectively. This particulate composition is particularly effective in inhibiting mold growth, and exhibits far better results than may be obtained through the use of equal amounts of only sodium diacetate or only sorbic acid.

The preferred weight ratio of sorbic acid to sodium diacetate in the particulate composition is from about 0.2/1 to about 0.7/1. The composition may contain a variety of other particulate materials that do not interfere with the mold-inhibiting action of the composition. For example, the composition may include a small amount of an anti-caking material, such as a zeolite, to maintain the particulate composition in a free-flowing condition. Fillers or carriers such as bentonite, clays and kaolin, may also be employed.

DETAILED DESCRIPTION

Both sorbic acid and sodium diacetate are nontoxic to man or animals when used in the proportions useful in the instant invention. Salts of sorbic acid, such as the sodium or potassium water-soluble salts, can be employed in place of the sorbic acid which is only slightly soluble in water. Sorbic acid itself, however, is preferred.

The particulate composition of the instant invention may be prepared simply and readily by dry-mixing together suitable quantities of sorbic acid and sodium diacetate in a suitable blender or drum until a substantially homogeneous physical mixture thereof has been obtained. It is possible, though unlikely, that some chemical reaction may occur between the sorbic acid and sodium diacetate even when mixed and stored in dry form, resulting, perhaps, in the production of acetic acid and the sodium salt of sorbic acid. Accordingly, as used herein, the recited compositions that include sorbic acid and sodium diacetate will be deemed to include any reaction products thereof as well. The substantially homogenous particulate composition may include, as well, small quantities of known anti-caking materials, typified by Zeolex 23-A, a product of J. M. Huber Corp. Sodium diacetate is somewhat hydroscopic, and the presence of the anti-caking material helps to maintain the free-flowing characteristics of the composition. Additional dry carriers or fillers such as bentonite, clay and kaolin may be employed as well. It is believed that the use of such fillers may contribute to the homogeneity of the dry coatings that are formed on each kernel. Through the use of fillers such as those described above, the amounts of sorbic acid or its salts and sodium diacetate may be significantly reduced, thereby reducing the raw material cost of the composition.

Treatment of whole kernel grains with the composition of the invention may be accomplished in a variety of ways. Appropriate amounts of the composition and grain may be added to a closed container, and the container itself may then be shaken, rolled or otherwise agitated to cause the kernels to rub against each other and thus to cause each kernel to become substantially coated with the particulate mixture. On a continuous basis, one may employ a drum having intake and exhaust ends, the drum being positioned generally horizontally with its exhaust end slightly lower than its intake end. Quantities of grain and of the mold-inhibiting composition may be charged to the intake end of the drum, and the drum, which is rotatable about its generally horizontal axis, may have a series of interior paddles or vanes to agitate the grain and composition as the drum is rotated or "tumbled" about its axis, the substantially homogenously coated grain kernels being withdrawn on a continuous basis from the exhaust end of the drum. Tumble drums in and of themselves are well known in the art, as are devices for metering quantities of seeds or of powdered substances. The latter devices often employ small hoppers for measuring given amounts, by volume or weight, of seeds or other materials, the hopper contents being discharged, in a predetermined manner, into the drum.

If desired, the sorbic acid or its salt and the sodium diacetate may separately, preferably concurrently, be coated upon the grain. With reference to the tumble drum described above, the sorbic acid or its salt and the sodium diacetate may separately be charged to the drum or may be mixed together immediately before they are charged to the drum.

The coating which ordinarily is formed on grain kernels in accordance with the invention is exceedingly thin, and often can be visually perceived only with great difficulty with the unaided eye.

The amount of the mold-inhibiting composition, by weight, that is employed with a given weight of grain is that amount which effectively inhibits mold. The effective concentration of the composition thus may vary according to the ratio of sorbic acid or its salts to sodium diacetate within the composition. For example, a composition having a weight ratio of sorbic acid to sodium diacetate of approximately 0.44/1 gave excellent mold-inhibiting results when used at a concentration by weight of 0.5% based on the weight of freshly harvested corn having a moisture content of approximately 22%. With a ratio of sorbic acid to sodium diacetate of approximately 0.11/1, excellent results were obtained at a concentration of the composition of approximately 1% by weight based upon the weight of the corn. The concentration of the composition also will depend upon the amount of moisture in the grain, and the grain moisture content may also require modification of the ratio of sorbic acid or its salt to sodium diacetate in the mold inhibiting composition.

The dry, powdery composition of the invention may also be employed to inhibit mold growth in such grain products (usually moist or wet) as middlings, brewer's by-products, corn gluten feeds and wet mashes from alcohol production. The preferred use, however, is with whole kernel grains.

EXAMPLE 1

To each of 57 glass jars was added 606 grams of freshly harvested whole kernel corn having a moisture content of 22%. The kernels in each jar were coated, as set out in Table 1 below, with a quantity of a candidate mold-inhibiting composition, the coating operation involving rapidly agitating a container of the corn kernels with a composition. The jars, with their tops open, were then stored at 70° F.-80° F. and at about 70%-85% relative humidity. The jars were periodically visually inspected for mold growth, and the following table reports the number of days required before mold growth was visually observed.

TABLE 1

| | | Days to Formation of Visible Mold | | |
|---|---|---|---|---|
| | | Percent by Weight of Inhibition Based on Weight of Corn | | |
| | Candidate Inhibitor | 0.0% | 0.5% | 1.0% |
| (A) | Control (no inhibitor) | 5 | — | |
| (B) | 97% Sodium diacetate 3% Zeolex 23-A | — | 12 | 60 |
| (C) | 87.3% Sodium diacetate 2.7% Zeolex 23-A 10% Sorbic acid | — | 5 | 90+ |
| (D) | 77.6% Sodium diacetate 2.4% Zeolex 23-A 20% Sorbic acid | — | 12 | 90+ |
| (E) | 68.9% Sodium diacetate 2.1% Zeolex 23-A 30% Sorbic acid | — | 90+ | 90+ |
| (F) | Sorbic acid (100%) | — | 5 | 9 |

EXAMPLE 2

Various candidate mold-inhibiting compositions were used to treat batches of corn freshly harvested at ten different farms in Wisconsin. The moisture content of the batches of corn varied from about 19% to about 33%. Certain batches of the corn were treated only with sodium diacetate at varying concentrations. Other batches were treated with a mixture of sorbic acid and sodium diacetate at a weight ratio of approximately 0.4/1. The results, reported in Table 2, indicate the expected increased susceptibility to mold of high moisture corn, and further show the excellent mold-inhibiting qualities of the formulation of the invention. The corn was treated in drums, and the treated corn was stored in steel or wood bins on each farm and was monitored daily for mold growth. The number of days required for approximately 30% of each batch of grain to become discolored and to show deterioration from mold growth is reported in the last column of Table II.

TABLE 2

| | | On-Farm Storage Days to Formation of Mold | | |
|---|---|---|---|---|
| Farm | % Moisture | Candidate Inhibitor | Wgt. % | Results: Days |
| A | 19-21 | Sodium diacetate | 0.6 | 90+ |
| B | 28-30.5 | Sodium diacetate | 0.6 | 21 |
| C | 20-22 | Sodium diacetate | 0.7 | 90+ |
| D | 27.5-32 | Sodium diacetate | 0.6 | 21 |
| E | 17-20 | Sodium diacetate | 0.75 | 14 |
| F | 22-25 | Sodium diacetate | 0.3 | 14 |
| G | 26.5-28.5 | Sodium diacetate | 0.45 | 14 |
| H | 30-33 | Sodium diacetate | 0.6 | 28 |
| I | 28 | Sorbic acid/ Sodium diacetate: 0.4/1 | 0.3 | 90+ |
| J | 28 | Sorbic acid/ Sodium diacetate: 0.4/1 | 0.45 | 90+ |

EXAMPLE 3

An inhibitor was prepared containing 77.6% of sodium diacetate, 2.4% of Zeolex 23-A as an anti-caking agent, and 20% of sodium sorbate, the percentages being by weight. The resulting dry, powdered mixture can be added to whole kernel corn within a glass jar which is shaken vigorously to coat the composition upon the corn kernels and to inhibit the formation of mold.

While a preferred embodiment of the present invention has been described, it should be understood that various changes, adaptations and modifications may be made therein without departing from the spirit of the invention and the scope of the appended claims.

What is claimed is:

1. Method of inhibiting mold growth in grain comprising coating the grain with an effective amount of a dry, particulate mixture containing synergistic mold-inhibiting quantities of sodium diacetate and sorbic acid or a salt thereof in which the weight ratio of sorbic acid or its salt to sodium diacetate ranges from about 0.2/1 to about 0.7/1.

2. Method of inhibiting mold growth in grain comprising coating the grain with an effective amount of a dry particulate mixture containing sorbic acid or a salt thereof and sodium diacetate in which the weight ratio of sorbic acid or its salt to sodium diacetate is in the range of about 0.1/1 to about 0.4/1.

3. The method of claim 2 in which individual kernels of the grain are substantially completely coated with said dry mixture.

4. The method of claim 3 in which said coating step includes the step of charging the grain, sorbic acid or its salt and sodium diacetate into a tumble drum and tumbling the same until individual kernels of the grain are substantially completely coated.

5. The method of claim 4 in which the sorbic acid or its salt and the sodium diacetate are separately charged to the drum.

6. The method of claim 4 in which the sorbic acid or its salt and the sodium diacetate are mixed together before they are charged to the drum.

7. Grain coated according to the method of any of claims 1, 2, 3 or 4.

8. Method of inhibiting mold growth in grain comprising coating the grain with an effective amount of dry, particulate mixture consisting essentially of zeolite and synergistic mold-inhibiting quantities of sodium diacetate and sorbic acid or a salt thereof, and in which the weight ratio of sorbic acid or its salt to sodium diacetate is in the range of from about 0.1/1 to about 0.4/1.

* * * * *